US006027597A

United States Patent [19]

Main

[11] Patent Number: 6,027,597

[45] Date of Patent: Feb. 22, 2000

[54] METHOD OF PRODUCING A SINGLE UNIT PHONE CARD ASSEMBLY

[75] Inventor: George W. Main, Essex Junction, Vt.

[73] Assignee: Bertex Systems, Inc., Cincinnati, Ohio

[21] Appl. No.: 09/103,170

[22] Filed: Jun. 22, 1998

Related U.S. Application Data

[62] Division of application No. 08/752,655, Nov. 19, 1996, Pat. No. 5,785,355.

[51] Int. Cl.[7] .................... B32B 31/00

[52] U.S. Cl. .................... 156/253; 156/257; 156/260; 156/267; 156/268; 156/270; 156/271; 156/277; 283/75; 283/98; 283/101; 283/108; 283/901

[58] Field of Search .................... 283/75, 101, 98, 283/108, 901; 156/252, 253, 256, 260, 267, 269, 270, 271, 291, 292, 277, 257, 268

[56] References Cited

U.S. PATENT DOCUMENTS

| | | | |
|---|---|---|---|
| 5,478,629 | 12/1995 | Norman | 428/200 |
| 5,673,309 | 9/1997 | Woynoski et al. | 379/144 |
| 5,782,497 | 7/1998 | Casagrande | 283/110 |
| 5,839,763 | 11/1998 | McCannel | 283/109 |

*Primary Examiner*—Richard Crispino
*Assistant Examiner*—Linda L. Gray
*Attorney, Agent, or Firm*—Thomas N. Neiman

[57] ABSTRACT

A method of producing a single unit phone card assembly including providing sheets of material including a primary sheet, a secondary sheet, and an overlaminating sheet; printing information on the primary sheet; applying a coating of release agent on a face side of the primary sheet; applying a coating of varnish on a rear side of the primary sheet; applying a layer of adhesive on a face side of the secondary sheet; laminating the rear side of the primary to the face side of the secondary sheet using the adhesive layer; cutting the primary sheet after lamination of the primary and secondary sheets; laminating the overlaminating sheet to the primary sheet such that the overlaminating sheet contacts the release agent; cutting the laminated primary, secondary, and overlaminating sheets to form the single unit phone card assembly and to form excess material; applying functional perforations to the assembly; and stripping the excess material from the assembly.

9 Claims, 3 Drawing Sheets

METHOD OF PRODUCING A SINGLE UNIT PHONE CARD ASSEMBLY

This application is a divisional application based upon application Ser. No. 08/752,655 filed on Nov. 19, 1996, now U.S. Pat. No. 5,785,355.

BACKGROUND OF THE INVENTION

This invention pertains to card type devices, and in particular, to a method of producing such single unit phone cards that are designed to allow the user to receive a single unit phone card having the vital information concealed until such time as the user wishes to use the information.

Many types of phone cards or collector cards are currently on the market. Most current cards are manufactured as a plain card having all the necessary information. The card is then enclosed in a wrap of cellophane or the like with an additional insert to conceal the personal identification numbers (pin), so that the specific information and the variably imaged personal identification numbers necessary for the call is kept hidden until such time as it is used. What is needed is a method of producing a single unit phone card assembly that will provide a simplified delivery system for the cards and not reveal the information nor the variably imaged personal identification number on the card until it is sought by the user. What has not been done in this area is a single piece item that can be in the form of a phone card that can contain important information on the sealed portion of the phone card that has been laminated together and, at the same time, can easily have sections removed to reveal that information. What is needed is a single unit phone card assembly that an individual can easily and effectively print on current printing equipment while, at the same time, maintaining a designated finished phone card size. What is also needed is a single unit phone card assembly which will allow a variable imaging printing capability upon any of the sides of the single unit phone card assembly.

Clearly, it is desirable for a item of this type to be very adaptable. At the same time, the item should be easy to manufacture and be produced of cost effective material. It is the object of this invention to set forth a method of producing a single unit phone card assembly which avoids the disadvantages, previously mentioned limitations of methods of producing typical phone card delivery systems.

SUMMARY OF THE INVENTION

Particularly, it is the object of this invention to teach a method of producing a single unit phone card assembly, for use in situations that require the use of an item that can be peeled apart and reveal additional information to the user without using any additional materials to deliver the assembly to the user, comprising the steps of providing sheets of material, a primary sheet, secondary sheet and overlaminating sheet, each of said sheets having a face side and a rear side; printing said primary sheet of material on any of the sides as desired for the purposes of the specific item; applying a coating of release agent on the face side of the primary sheet in a predetermined fashion in order to facilitate separation of the primary sheet and the overlaminating sheet when desired; applying a pattern of varnish on the rear side of the primary sheet in a predetermined fashion; applying an adhesive layer on the face side of the secondary sheet in a predetermined fashion; slitting and crossing over said primary sheet and said secondary sheet; laminating of the sheets together transferring the adhesive layer into the position desired; internally cutting of the primary sheet of said assembly; overlaying a layer of material over said assembly; externally cutting said assembly as desired to create the external dimensions of the assembly; applying functional perforations as necessary; and stripping excess material from said assembly.

BRIEF DESCRIPTION OF THE INVENTION

Further objects and features of this invention will become more apparent by reference to the following description taken in conjunction with the following figures, in which.

DESCRIPTION OF THE PREFERRED EMBODIMENTS

Figure 1:
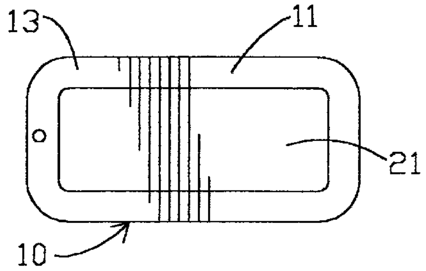
FIG. 1 is a bottom plan view of the primary sheet of the single unit phone card assembly.
Figure 2:
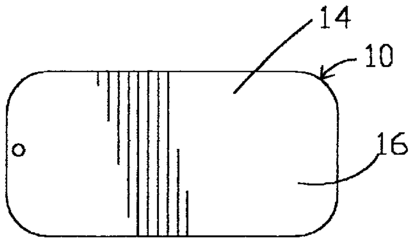
FIG. 2 is a bottom plan view of the secondary sheet thereof.
Figure 3:
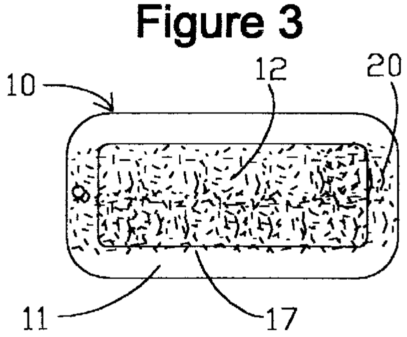
FIG. 3 is top plan view of the primary sheet of the single unit phone card assembly.
Figure 4:
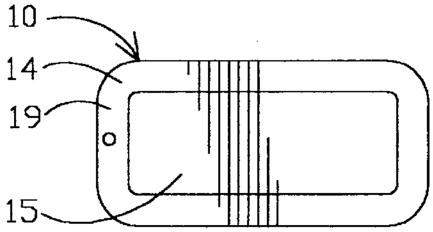
FIG. 4 is a top plan view of the secondary sheet thereof.
Figure 5:
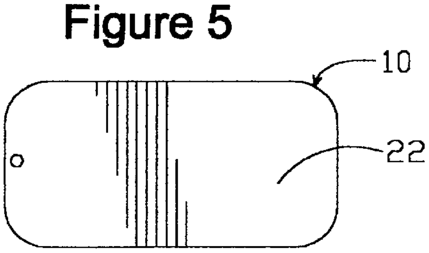
FIG. 5 is a top plan view of the overlay material.
Figure 6:
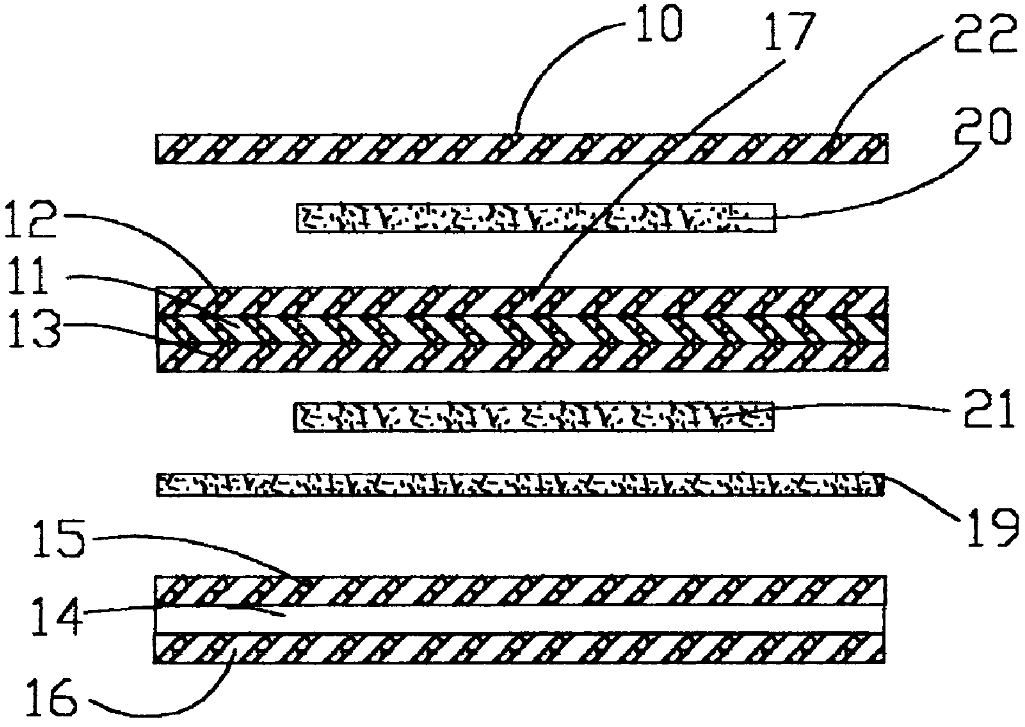
FIG. 6 is a cross sectional view of the novel construction.
Figure 7:
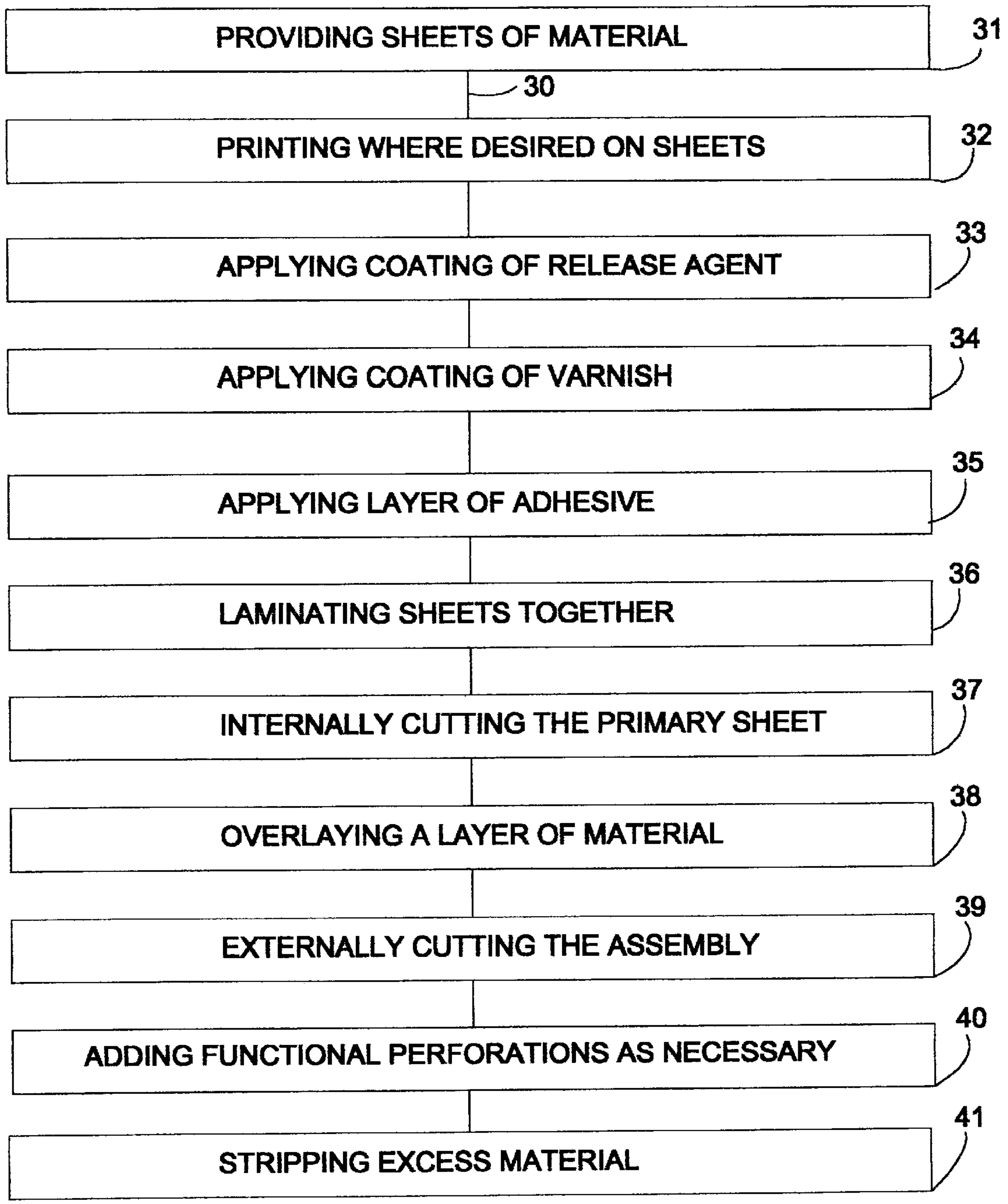
FIG. 7 is a block diagram showing the novel method of producing a single unit phone card assembly.

As shown in the figures, the novel single unit phone card assembly 10 comprises a primary sheet 11 having a face side 12 and a rear side 13. The front side 12 and the rear side 13 have a plurality of printable areas upon which variable imagining information such as personal identification numbers may be printed. A secondary sheet 14 is provided having a face side 15 and a rear side 16 upon which there are a plurality of printable areas that instructions, personalized information or the like can be printed thereon depending on what the specific requirements of the particular card happen to be. It is also possible to print specific variable information to be printed on any side of the card. The face side 15 of the secondary sheet 14 has a layer of adhesive 19 applied in a predetermined pattern (shown around the edge of the sheet) depending upon the specific requirements of the particular card.

A release agent such as a coating of silicone 20 would be applied in predetermined areas (shown in the central area of the primary sheet) of the face side 12 of the primary sheet 11 and the rear side 13 of the primary sheet 11 is coated with a dry strippable varnish 21 (shown in the central area of the secondary sheet). The pattern used with the release agent will be matched up with the adhesive patterns to facilitate the opening of areas of the card assembly 10. The release agent application and the application of the varnish would be limited to those areas where opening is desired, not the whole card. A die cut 17 of the primary sheet is performed, which in combination with the position of the silicone 20 and varnish 21 specify the areas to be visible when opened. The sheets 11 and 14 are then laminated together. This can be accomplished by slitting and crossing over the web of material or by using two webs of material. The pattern of adhesive is transferred onto the proper position on the other sheet during the lamination process. A sheet of plastic film 22 is then laminated over the entire assembly 10 creating the finished product. A series of perforations can be added through the overlaminate, primary and secondary sheets as needed for the particular construction.

The novel method 30 of producing single unit phone cards comprises the following steps: providing a sheets of material, a primary sheet and a secondary sheet, each having a face side and a rear side 31; printing said primary sheet of material on any of the sides as desired for the purposes of the specific item 32; applying a coating of a release agent on the face side of the primary sheet in order to facilitate separation of the sheets of material when desired 33; applying a pattern of varnish on the rear side of the primary sheet in a predetermined fashion 34; applying a layer of adhesive on the face side of the secondary sheet in a predetermined fashion 35; laminating said sheets together transferring the layer of adhesive into the position desired 36; internally cutting of the primary sheet of said assembly 37; overlaying a layer of material over said assembly 38; externally cutting said assembly as desired to create the external dimensions of the assembly 39; applying functional perforations as necessary 40; and stripping excess material from the assembly 41.

The release agent, the varnish and the adhesive can be applied in a manner that will determine those areas of the card that the manufacturer wishes to have separated by the consumer. The multiple layers of material can be produced from two separate webs of material or can be produced from a single web that is slit and crossed over onto itself during the process of manufacturing. The overlay material and the primary and secondary sheet are designed to provide security for the card and ease of access for the user when needed. The flexibility provided to the manufacturer afforded by this process allows an infinite number of formats of cards to be produced to meet the demands of the clients.

While I have described my invention in connection with specific embodiments thereof, it is clearly to be understood that this is done only by way of example and not as a limitation to the scope of my invention as set forth in the objects thereof and in the appended claims.

I claim:

1. A method of producing a single unit phone card assembly, for use in situations that require the use of an item that can be peeled apart to reveal additional information to a user without using any additional materials to deliver the item to the user, comprising the steps of:

providing sheets of material including a primary sheet, a secondary sheet, and an overlaminating sheet, each said sheet having a face side and a rear side;

printing information on said primary sheet on any of the sides;

applying a coating of release agent on the face side of the primary sheet;

applying a coating of varnish on the rear side of the primary sheet;

applying a layer of adhesive on the face side of the secondary sheet;

laminating the rear side of the primary to the face side of the secondary sheet using the adhesive layer;

cutting the primary sheet after lamination of the primary and secondary sheets;

laminating the overlaminating sheet to the primary sheet such that the overlaminating sheet contacts the release agent;

cutting the laminated primary, secondary, and overlaminating sheets to form the single unit phone card assembly and to form excess material;

applying functional perforations to the assembly; and stripping the excess material from the assembly.

2. A method of producing a single unit phone card assembly, according to claim 1, wherein said primary sheet, said secondary sheet, and said overlaminating sheet are made of a material selected from the group consisting of cellulose and plastic.

3. A method of producing a single unit phone card assembly, according to claim 1, wherein said printing comprises printing of variable information.

4. A method of producing a single unit phone card assembly, according to claim 1, wherein said applying a coating of release agent step comprises applying a coating of silicone in a predetermined pattern.

5. A method of producing a single unit phone card assembly, according to claim 1, wherein said applying a coating of varnish step comprises applying a coating of a dry strippable varnish in a predetermined pattern.

6. A method of producing a single unit phone card assembly, according to claim 1, wherein said applying an adhesive layer step comprises applying said adhesive layer in a predetermined pattern.

7. A method of producing a single unit phone card assembly, according to claim 1, wherein said step of laminating the primary sheet to the secondary sheet comprises laminating under pressure.

8. A method of producing a single unit phone card assembly, according to claim 1, wherein the overlaminating sheet is a plastic film.

9. A method of producing a single unit phone card assembly, according to claim 1, wherein said cutting of the primary sheet after lamination of the primary and secondary sheets and said cutting the laminated primary, secondary, and overlaminating sheets to form the single unit phone card assembly and to form excess material comprises die cutting.

* * * * *